United States Patent [19]
Reichardt et al.

[11] Patent Number: 5,693,293
[45] Date of Patent: Dec. 2, 1997

[54] APPARATUS FOR THE PURIFICATION OF WASTE GAS

[75] Inventors: Horst Reichardt; Lothar Ritter; Lutz Labs; Konrad Gehmlich; Michael Hentrich; Günter Firkert; Volkmar Hennig; Matthias Schubert, all of Dresden, Germany

[73] Assignee: DAS-Dünnschicht Anlagen Systeme GmbH Dresden, Dresden, Germany

[21] Appl. No.: 564,208

[22] PCT Filed: Jun. 17, 1994

[86] PCT No.: PCT/EP94/01985

§ 371 Date: Dec. 18, 1995

§ 102(e) Date: Dec. 18, 1995

[87] PCT Pub. No.: WO95/00805

PCT Pub. Date: Jan. 5, 1995

[30] Foreign Application Priority Data

Jun. 17, 1993 [DE] Germany .................. 43 20 044.3

[51] Int. Cl.$^6$ .................................................. B01D 53/00
[52] U.S. Cl. ..................... 422/168; 431/5; 110/215; 110/344
[58] Field of Search .............. 423/210; 422/168; 431/5, 121; 110/344, 215; 55/240

[56] References Cited

U.S. PATENT DOCUMENTS 4,555,389  11/1985  Soneta et al. ...................... 423/210

FOREIGN PATENT DOCUMENTS

| 0285485 | 10/1988 | European Pat. Off. ............... 423/210 |
| 0 346 893 A1 | 12/1989 | European Pat. Off. . |
| 0 347 753 A1 | 12/1989 | European Pat. Off. . |
| 57-68122 | 4/1982 | Japan . |
| 60-118216 | 6/1985 | Japan ................................ 423/210 |
| 61-93310 | 5/1986 | Japan ................................ 423/210 |
| 63-62528 | 3/1988 | Japan . |

Primary Examiner—Gary P. Straub
Assistant Examiner—Timothy C. Vanoy
Attorney, Agent, or Firm—Browdy and Neimark

[57] ABSTRACT

Waste gas, in particular from plants for the chemical vapor-phase deposition and for the separation and etching by plasma processes, is purified from toxic agents by a method in which partial processes of the purification, such as thermal decomposition and oxidation, sorption of solid and gaseous reaction products, hydrolysis and cooling, are combined to act in a single reaction chamber. The reaction products of the waste gas burnt in a flame are led, directly in the combustion chamber, through a space filled with a finely dispersed liquid. This liquid forms a liquid film on all parts and inside walls of the reaction chamber. In a combustion chamber with a burner, the mentioned liquid distribution is obtained by a spraying device.

Effective purification from toxic agents, and little corrosion of the components of the reaction chamber are achieved, any growth of solid reaction products in the combustion chamber being avoided. The generation of secondary toxic agents during the combustion of the waste gas is avoided.

3 Claims, 1 Drawing Sheet

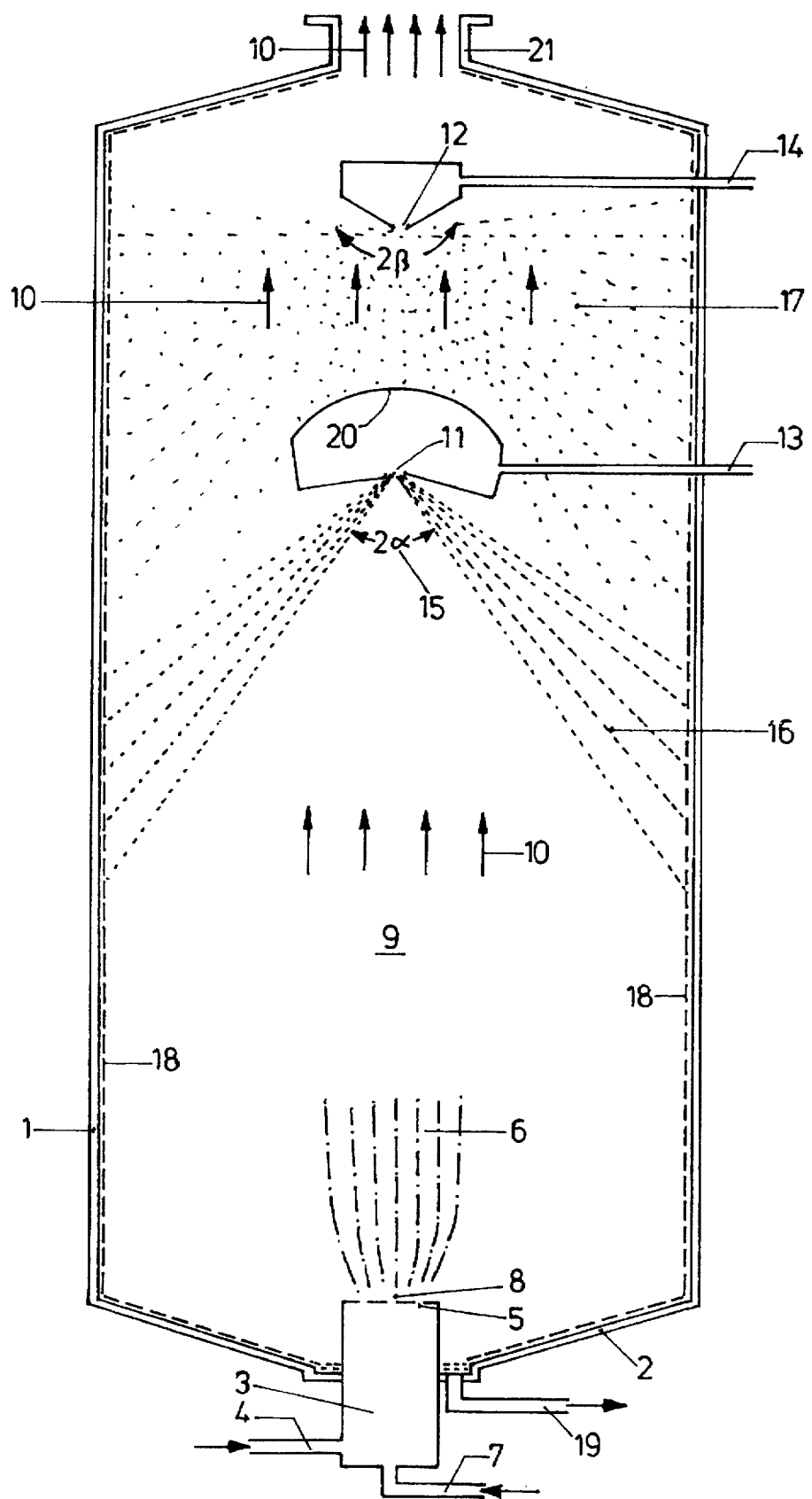

APPARATUS FOR THE PURIFICATION OF WASTE GAS

This application is a 371 of PCT/EP94/01985 filed 17 Jun. 1994.

BACKGROUND OF THE INVENTION

1. Technical Field of the Invention

The invention relates to a method and an apparatus for the purification of waste gas that develops in particular in plants for chemical vapor-phase deposition (CVD) and for the removal or separation by plasma processes.

2. Prior Art

Apart from substances generally regarded as unobjectionable, such as nitrogen and argon, waste gas of this kind contains toxic agents which are completely removed or reduced to admissible limits by the purification method. For the purpose of purification, the waste gas is conducted through the purification apparatus directly after leaving the production plant or after being collected from several plants.

Quite a number of methods are known for the purification of waste gas. It is very often effected by the sorption of the toxic agents for instance in an oxidizing aequous solution. To this end, intense contact of the waste gas and the sorption agent takes place in a column, a spray tower or in any other kind of a washer. Toxic agents that are not, or not efficiently, sorbed in this way can be converted by methods of thermal decomposition by heating or by combustion and removed from the waste gas. If the toxic agents themselves are not combustible, they are burnt in a flame by the addition of excess oxygen. The combustion takes place in a burner-type combustion chamber, on the walls of which solid combustion products such as $SiO_2$ will deposit. Since the separation of solid reaction products in the combustion chamber is not complete, and, in particular, since the combustion is mostly accompanied by secondary, gaseous toxic agents forming, multistage purification methods are known to be used, in which partial processes of purification take place one after the other, such as thermal decomposition or oxidation, cooling, hydrolysis, sorption and ablution of solid reaction products (EP 0 347 754 A1). Subsequent to the combustion chamber, the waste gas is transferred to a separate reaction chamber, there being subjected to intense contact with a sorbent.

To this end, the waste gas is conducted successively through a combustion chamber and at least one device that works on the washing principle. Also, apparatuses have been proposed for the purification of waste gas. To this end, the waste gas is conducted successively through a device comprising a combustion chamber and at least another device that works on the washing principle, the two forming a unit constructionally (EP 0 347 753 A1). The combustion chamber and an external separate reaction chamber are separated by an inner wall.

A disadvantage of the waste gas purification based on the thermal decomposition or oxidation of the toxic agents in a combustion chamber with the formation of solid reaction products resides in that the latter will deposit on the walls of the combustion chamber. With high throughputs of toxic agents, thick layers will grow on these walls. After a while these deposits can become so thick that the process will be strongly affected by faulty flow conditions or even become impossible by "overgrowth".

Another disadvantage resides in the corrosion of the material of the walls and of other components of the combustion chamber under the influence of gaseous reaction products of the combustion. This corrosion is increased critically owing to the high temperature of the waste gas burnt or to their composition, if the waste gas contains for instance hydrogen halogenide (e.g. HCL HF) and water vapor.

Furthermore, negative effects may reside in that secondary toxic agents, for instance dioxins, form upon the cooling of the burnt waste gas on the way from the combustion chamber into a subsequent sorption chamber or sorption device.

Use is also made of absorption or adsorption methods in which a partial removal of toxic agents from the waste gas is performed (Japanese patent 812 2025, Japanese patent 6203 0525, Japanese patent 6213 6230).

However, the main disadvantage of these methods resides in that the toxins are not eliminated, but that solid or liquid absorbents of the same or even increased toxic contamination will originate and have to be lodged in a dump.

OBJECT AND SUMMARY OF THE INVENTION

It is the object of the invention to improve the efficiency in the purification of waste gas, in particular from CVD and plasma processes, with the aid of methods and apparatuses in which further partial processes such as sorption will take place in addition to the thermal decomposition or oxidation of the toxic agents. Further, it is to be ensured that the corrosion of parts of the combustion chamber is reduced with a view to a prolonged service life. Yet another partial object resides in clearly prolonging the operating time of the apparatus between two cleaning cycles for the removal of deposits of solid reaction products. Moreover, it is to be ensured that no secondary toxic agents will originate during the purification.

The method proceeds from that combustible gas for the production of a flame is supplied into a combustion chamber, and that the waste gas is led into this flame, the thermal decomposition of the toxic agents of the waste gas being effected in the flame. If toxic agents are to be oxidized, additional oxygen is added to the combustible gas or waste gas. The burnt waste gas contains solid and/or gaseous reaction products of the toxic agents.

According to the invention, a liquid is fed directly into the combustion chamber, where it is sprayed in such a way that it is finely dispersed, filling the space above the burner and above the combustible gas flame. In addition to the thermal partial processes, this helps in effectively performing a number of further partial processes for waste gas purification directly in the combustion chamber. They consist in that the flow of burnt waste gas is conducted through the space of finely dispersed liquid and then discharged from the combustion chamber. If water is used as a liquid, solid reaction products such as $SiO_2$ can be washed out. Water is also suitable for the sorption of gaseous and vaporous reaction products, for instance $NO_2$, for the hydrolysis for instance of HCl or HF, and also for the cooling of the flow of burnt waste gas. Components that are reactive, in particular neutralizing, can be added to the water. In this way, acids are prevented from forming right in the combustion chamber.

The direct contact of the liquid with the flow of burnt waste gas within the combustion chamber helps increase the efficiency of the waste gas purification decisively. The formation of solid reaction products takes place virtually entirely in the combustion chamber. Thus, any sorption devices that may be additionnally connected are not contaminated and their operation is not affected.

The direct contact of the hot flow of burnt waste gas with the cold liquid helps prevent the formation of secondary gaseous toxic agents not easily soluble in water, such as dioxins. The reason for this probably resides in that the hot flow of waste gas is cooled suddenly by a high temperature gradient.

The liquid sprayed in the combustion chamber deposits as a film when contacting the walls of the combustion chamber. This liquid film enlarges the effective interface towards the liquid which the flow of gas contacts. The liquid film on the walls thus contributes to the sorption of solid and gaseous reaction products from the burnt waste gas, to the reaction with secondary toxic agents and to the cooling. In particular, this film of water prevents the deposition of solid reaction products of the combustion on the walls. The growing of thick layers that impede the process is avoided.

This liquid film also helps avoid the direct contact of the hot burnt waste gas with the walls. Corrosive constituents will become effective on the walls only after being cooled and sorbed in the liquid, and thus in a lower concentration. As a result, the corrosion is strictly reduced and the service life of the components of the combustion chamber is prolonged.

The liquid film flows downwards on the walls of the combustion chamber. The liquid that is discharged in the vicinity of the bottom of the combustion chamber takes along the sorbed solid and gaseous constituents of the combustion and reaction products of the burnt waste gas.

The periods for which the combustion chamber can work before another cleaning will become necessary are multiplied.

The method is put into practice with the aid of an apparatus substantially comprising a perferably rotationally symmetrical combustion chamber with a burner, and inlets for the combustible gas and the waste gas that contains toxic agents. As the case may be, additional oxygen is added to the combustible gas or the waste gas. The combustible gas used may for instance be a hydrogen-oxygen mix or a natural gas-oxygen mix. The combustible gas flame forms above the burner. The heated or burnt combustible and waste gas flows through the combustion chamber in the direction towards a connection for a ventilation system for the discharge of the purified waste gas. In accordance with the invention, the apparatus comprises a spraying device for a liquid disposed in upper portion of the combustion chamber. This spraying device consists of a hollow-cone nozzle and a solid-cone nozzle, which are both fixed in the axis of the burner. The distance between the burner and the hollow-cone nozzle is set such that it is sufficient for the formation of the combustible gas flame and for the complete thermal decomposition and oxidation of the toxic agents. The hollow-cone nozzle sprays the said liquid in such a way that an angle sector remains free from liquid around the axis, the burner being disposed in this angle sector. This angular spread is preferably set to an angle $2\alpha$ exceeding 50°. The fact that the liquid is sprayed by the hollow-cone nozzle ensures that the combustion flame can form in the space between the burner and the hollow-cone nozzle without being extinguished by the liquid; on the other hand, the hollow cone formed by the liquid prevents the flow of burnt combustible and waste gas from contacting parts of the combustion chamber, for instance the nozzle and liquid inlets, without prior contact with the liquid. The axial distance between the hollow-cone nozzle and the solid-cone nozzle exceeds the radius of the combustion chamber. By means of the solid-cone nozzle, the liquid is sprayed in the form of a solid cone of an angle of $2\beta$ exceeding 90°. Angles of more than 90° are appropriate for filling the space, between the nozzles, of the combustion chamber as completely as possible with finely dispersed liquid.

Owing to the high densitiy of liquid droplets, the hollow cone of finely dispersed liquid acts as a "shield" for the liquid sprayed by the solid-cone nozzle, preventing any inadvertent penetration of liquid into the combustion chamber.

The rear of the hollow-cone nozzle is provided with a face convex in the direction of the flow of gas, the diameter of which exceeds or equals the diameter of the burner. This helps ensure that the liquid of the solid-cone nozzle is not sprayed directly into the burner. The convex face works as a splash guard. Any liquid dropping off it will be out of the reach of the burner. Consequently, the formation of the burning flame and the combustion of the toxic agents is not affected by liquid from the solid-cone nozzle.

The flow of burnt combustible gas and of toxic agents is conducted through the space that is filled with finely dispersed liquid. This is where the said non-thermal partial processes of waste gas purification take place. Suitably, an additional sorption device, such as a dehumidifier, a washer or a filter can top the combustion chamber via a suction conduit. This contributes to further reducing the toxic constituents of the waste gas purified in the combustion chamber. The topping of the combustion chamber by an additional sorption device is especially advantageous if the device acts selectively on toxic agents that have not yet been removed from the waste gas in the combustion chamber.

The consumption of sorbents can be strictly reduced if the sorbent discharged from the combustion chamber and containing reaction products of the waste gas combustion and of the reaction of the burnt waste gas with the water, is recovered in a sorbent regenerative system, and if the sorbent is circulated.

Another suitable embodiment of the apparatus according to the invention resides in inserting a layer of fillers in part of the space between the two nozzles. Thus the contact face of the liquid and the flow of gas is increased in a manner known per se, the fact that the flow of burnt gas first contacts the finely dispersed liquid not being negatively affected. The sprayed liquid from the hollow-cone nozzle as well as from the solid-cone nozzle deposits on the walls of the combustion chamber. It forms a liquid film on these walls, flowing downwards to the bottom of the combustion chamber.

BRIEF DESCRIPTION OF THE DRAWINGS

Further details of the invention will become apparent from the description of a preferred embodiment of the apparatus, taken in conjunction with the drawing. FIG. 1 illustrates a longitudinal section of the apparatus according to the invention.

DESCRIPTION OF THE PREFERRED EMBODIMENT

FIG. 2 illustrates an alternative embodiment of the invention according to FIG. 1.

DETAILED DESCRIPTION OF THE PREFERRED EMBODIMENT(S) OF THE INVENTION

The apparatus according to the invention substantially comprises a cylindrical combustion chamber 1 of stainless sheet steel. It has a diameter of 18 cm and a height of 60 cm.

A burner 3 is disposed in the vicinity of the conical bottom 2 of the combustion chamber 1, combustible gas $H_2$ and $O_2$ being supplied to the burner 3 via an inlet 4. The burner 3 has a diameter of 25 mm.

The combustible gas flame 6 forms above the apertures 5. The waste gas with the toxic agents is supplied to the burner 3 via the inlet 7. It enters the combustible gas flame 6 centrally through the drill hole 8. The thermal decomposition and oxidation of the toxic agents takes place in the combustion chamber 9. The arrows 10 mark the direction of the flow of burnt combustible and waste gas. At a distance of about 40 cm and 55 cm, respectively, from the bottom 2, a hollow-cone nozzle 11 and a solid-cone nozzle 12 are disposed axially one after the other, which are fastened to the supply lines 13 and 14, respectively, for water used as a sorption agent. The hollow-cone nozzle 11 sprays water in such a way that the angle sector 15 ($2\alpha \approx 80°$) is substantially free from droplets and that the sprayed water fills a space 16 that is approximately in the form of a hollow cone. Finely dispersed water from the solid cone nozzle 13 virtually fills the entire space 17 ($2\beta \approx 180°$) between the two nozzles. The sprayed water from the spaces 16 and 17 meets with the inside walls of the combustion chamber 3, forming a liquid film 18. It flows downwards on the walls into the conical bottom 2, where it is discharged from the combustion chamber 1 via an outlet 19.

As shown in FIG. 2, another suitable embodiment of the apparatus according to the invention resides in inserting a layer of fillers 22 in part of the space between the two nozzles 11, 12 on a supporting grid 23. This results in an increase of the contact face of the liquid and the flow of gas without negatively affecting the flow of gas through the finely dispersed liquid.

The consumption of sorbents can be strictly reduced if the sorbent discharged from the combustion chamber and containing reaction products of the waste gas combustion and of the reaction of the burnt waste gas with the water, is recovered in a sorbent regenerative system 24, and if the sorbent is circulated.

The rear of the hollow-cone nozzle 11 is in the form of a spherical cap 20 of a radius of 40 mm, the diameter of the cap being 60 mm.

The purified waste gas is discharged via the connection 21 into the ventilation system.

The purification apparatus is completed by ignition devices for the combustible gas flame and by checking devices for the flow of combustible gas and the water as well as by sensors and actuators for increasing the process safety.

Example for the performance of the process:

In a CVD plant for the deposition of phosphorus gas, waste gas quantities of in each case 55 l/min develop during the wafer separation as well as during the in-situ cleanings, performed alternately, of the process chamber. The waste gas developing during the deposition contains $SiH_4$, $PH_3$ as toxic agents and oxidation products of these agents. The waste gas developing during the in-situ cleaning of the process chamber contains $C_2F_6$ as a toxic agent, which is thermally decomposable and then hydrolyzable. In either process, nitrogen is the substantial constituent of the waste gas, preferably ranging from 90–95%.

The waste gas is supplied to the purification apparatus via a waste gas conduit. In the combustion chamber 1 of the purification apparatus, a flame is kept burning by the supply of 15 l/min of hydrogen and 10 l/min of oxygen to a burner 3. After the complete combustion of the hydrogen, there is still heated excess oxygen in the burning flame. The waste gas is supplied in the axis of the burner 3. It is heated. The toxic agents $SiH_4$ and $PH_3$ are oxidized to silicon dioxide and phosphorus oxide as well as well as water. $C_2F_6$ is decomposed to HF and $CO_2$.

The upper third of the combustion chamber 1 is filled with droplets of water. Approximately 10 l/min of water are additionally fed into the combustion chamber and sprayed. When the droplets of water meet with the walls of the combustion chamber 1, a film of water 18 forms on the latter. The water flows downwards on the walls. It is collected in the vicinity of the bottom 2 of the combustion chamber 1 and discharged. The burnt combustible and waste gas of a temperature of about 1000° C. flows vertically from the burner 3 through the space 16 filled with water droplets. The solid silicon dioxide is colloidally solved in water, the phosphorus oxide reacts with water to phosphorus acid, the HF to hydrofluoric acid. The purified waste gas is discharged along the surface of the cover of the combustion chamber 1. When the hot burnt combustible and waste gas meets with the droplets, it is cooled down to less than 50° C. Reaction products are sorbed in the water droplets and discharged together with them from the combustion chamber.

We claim:

1. An apparatus for the purification of waste gas comprising a combustion chamber and burner having inlets for a combustible gas and a waste gas having toxic agents said inlets arranged at the bottom of the combustion chamber and an outlet at the top of the combustion chamber, wherein an upper portion of the combustion chamber (1) is provided with a spraying means for a liquid, said spraying means being disposed coaxially with a central axis of the burner (3) and of said combustion chamber, the spraying means consisting of a hollow-cone nozzle (11) and of a solid-cone nozzle (12), wherein said hollow-cone nozzle (11) sprays the liquid in the form of a hollow spray cone, wherein said solid-cone nozzle (12) is arranged above-said hollow-cone nozzle (11) along said central axis, the hollow spray cone generated by the hollow cone nozzle having a liquid-free inner space having an angle of aperture ($2\alpha$) exceeding 50°, and wherein the solid-cone nozzle (12) produces a spray having an angular spread ($2\beta$) more than 90° wherein a rear of the hollow-cone nozzle (11) is provided with a convex surface facing toward said solid-cone nozzle (12), a diameter of said convex surface exceeding or equalling the diameter of the burner (3).

2. An apparatus according to claim 1, wherein a layer of filler means for increasing a contact between the liquid and a flow of the waste gas is disposed on a supporting grid, said layer of filler means being inserted in part of the space (17) between the two nozzles.

3. An apparatus according to claim 1, wherein the cylindrical combustion chamber (1) is provided with a sorbent regenerative system via the outlet (19).

* * * * *